Figure 1:
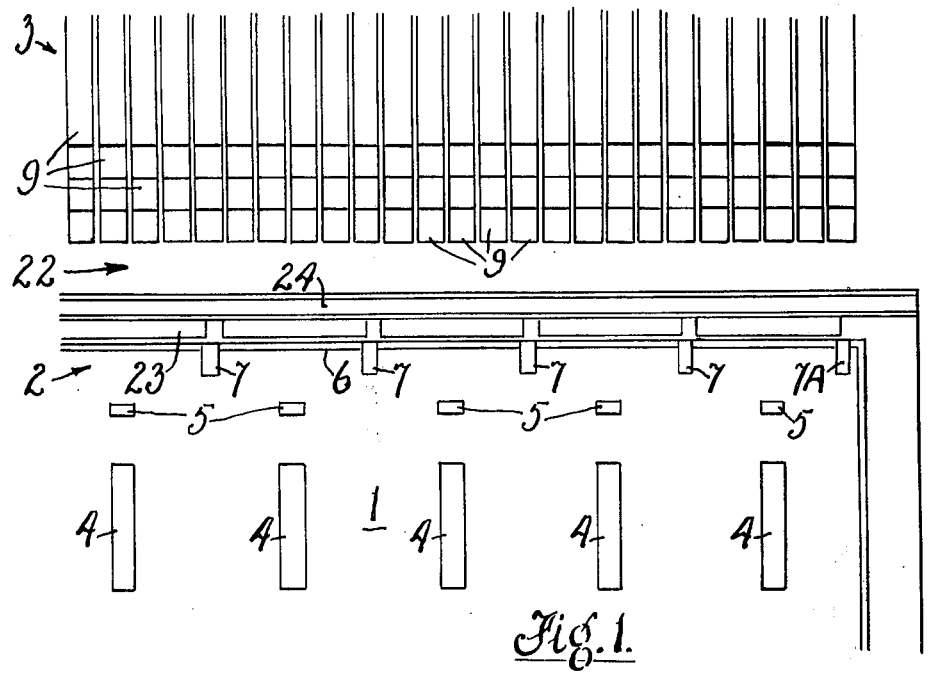

United States Patent [19]
Dunphy

[11] 3,920,100

[45] Nov. 18, 1975

[54] VENDING OF ARTICLES

[76] Inventor: Lawrence Cyril Dunphy, 9 Scottswood Close, Bushey, Hertfordshire, England

[22] Filed: June 10, 1974

[21] Appl. No.: 478,057

[30] Foreign Application Priority Data
June 22, 1973 United Kingdom............ 29728/73

[52] U.S. Cl. ............................. 186/1 A; 186/1 B
[51] Int. Cl.² ........................................ E04H 3/02
[58] Field of Search .................. 186/1 R, 1 A, 1 B

[56] References Cited
UNITED STATES PATENTS

| | | | |
|---|---|---|---|
| 1,645,694 | 10/1927 | Esgro .................................. | 186/1 B |
| 2,276,293 | 3/1942 | Farmer................................ | 186/1 B |
| 2,661,682 | 12/1953 | Saunders........................ | 186/1 B X |

*Primary Examiner*—Robert J. Spar
*Assistant Examiner*—George F. Abraham
*Attorney, Agent, or Firm*—Brisebois & Kruger

[57] ABSTRACT

In a method of vending which avoids unnecessary handling of the articles before payment therefor and also reduces the risk of shop lifting, dummy articles which correspond to those offered for sale are on show in a display area along with tokens carrying information relating to the article, a customer selects various tokens and hands them to an assistant who takes the corresponding articles from convyeors leading from a storage area innaccessible to the customer and puts them in a receptacle the interior of which is also innaccessible to the customer. The receptacle is displaced along a guide path to a pay area where the customer pays for the aritcles and receives them from the receptacle.

6 Claims, 5 Drawing Figures

VENDING OF ARTICLES

This invention relates to a method of vending of articles and to an emporium in which this method of vending can take place.

The vending of groceries and other goods in a supermarket is well known and consists essentially of the customer selecting the articles required from goods on display, placing the articles in a receptacle such as a wire basket or trolley and taking them to a pay area where the cost of the goods is calculated and after paying for the goods they are given to the customer. These supermarkets are plagued by shoplifting where unscrupulous customers take some articles from the display shelves and do not show them to the shop assistant at the pay area thereby avoiding paying for the articles concerned.

In this method of vending the goods are handled several times. In the first case the customer takes the goods from the display shelves and puts them in the wire basket or trolley, and at the pay area the shop assistant takes the goods from the basket places them on a counter and the customer then takes the goods from the counter and places them in his or her shopping basket. In many cases goods are handled in the display area and are then not purchased and put back on the display area. In the case of certain goods such as meat, frozen foods and the like it means that the food is unnecessarily handled before it is actually purchased by a customer.

It is an object of the present invention to provide a method of vending and an emporium in which such vending can take place in which the opportunities for a customer to steal articles is considerably reduced and in which unwanted handling of the goods before purchase is reduced.

According to a first aspect of the invention in a method of vending, for each article to be purchased the customer selects from a display area a token carrying information relating to the article, the or each token is given by the customer to an assistant who selects the article corresponding to the token from one of a multiplicity of conveyors leading from a storage area and inaccessible to the customer and places it in a receptacle the interior of which is also inaccessible to the customer, the receptacle containing the article(s) is displaced along a guide path to a pay area where the customer pays for the article(s) and receives the article(s) from the receptacle.

The tokens corresponding to the article(s) in the receptacle may be transferred with the receptacle to the pay area and at the pay area the information on the or each token is used to determine the total amount which the customer is charged. In this way the assistant at the pay area does not have to take each article out of the receptacle, examine it to find the price ticket, and then put it down on a counter for it to be subsequently picked up by the customer.

In the display area only dummy products are on show and as the customer is unable to gain access to the articles until the receptacle arrives at the pay area and the customer has been charged for the contents of the receptacle, the opportunities for shoplifting are considerably reduced. Furthermore unnecessary handling of goods which are not subsequently bought by the customer is reduced.

According to a second aspect of the invention an emporium has a display area to which potential customers have access and containing dummy articles and tokens carrying information relating to the articles which are offered for sale, a serving counter separating said display area from a second area to which the customers do not have access, a multiplicity of conveyors extending from a storage area to said second area, the articles offered for sale being brought to the second area on said conveyors said display area having at least one pay area at which a customer pays for articles corresponding to tokens selected in the display area and means for guiding a receptacle, the interior of which is inaccessible to the display area but accessible to the second area, along said counter to at least one pay area whereby articles corresponding to tokens selected by a customer in the display area and placed in the receptacle in the second area are transferred to the pay area and are delivered to the customer after payment.

The tokens are conveniently in the form of plates of plastics material containing a label or photograph of the article it represents and also information relating to the price and conveniently the stock number of the article.

The conveyors which extend to the second area from the storage area are conveniently arranged to be displaced in the direction of their lengths by a distance substantially equal to the spacing of the articles they are supporting each time one article is removed from the conveyor. In this way articles placed on the conveyor in the storage area are brought forward in stepwise manner into the second area and the assistant removes the articles from the conveyors and puts them in the receptacle.

A serving counter for use in such an emporium has guide means extending along part of its length, a plurality of receptacles each of which is open only at one side and has means which co-operate with said guide means on the counter to enable the receptacle to be guided along the counter.

Figure 2:
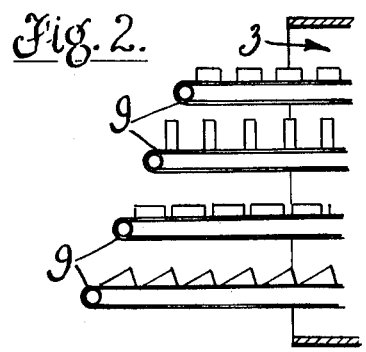
Figure 3:
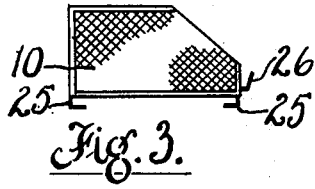
Figure 4:
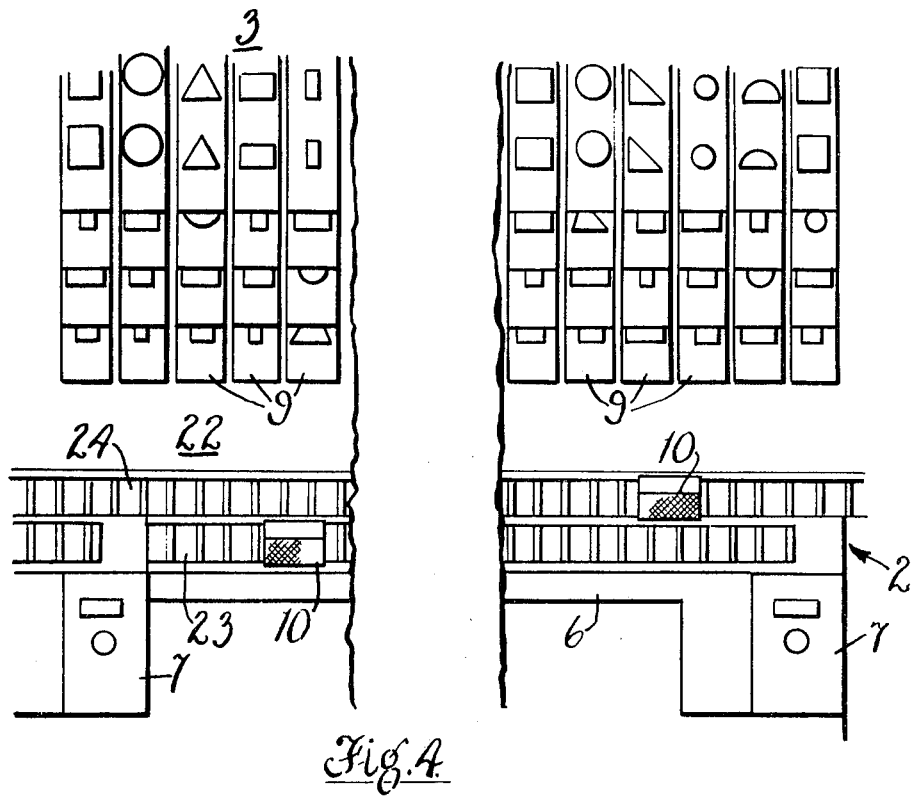
Figure 5:
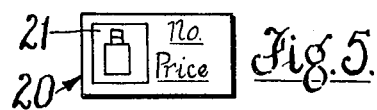

In order that the invention may be more readily understood it will now be described, by way of example only, with reference to the accompanying drawings in which FIG. 1 is a diagrammatic plan of an emporium, FIG. 2 is a diagrammatic side elevation of a plurality of conveyors leading to the second area of the emporium, FIG. 3 is a side elevation of a receptacle for receiving articles chosen by the customer, FIG. 4 is a plan, partly broken away showing in more detail the serving counter and pay areas shown in FIG. 1, and FIG. 5 is a plan of a token.

Referring to FIG. 1 an emporium for selling articles such as groceries has a display area 1, a counter and pay area 2 and a storage area 3. In the display area 1 a customer can examine dummy articles corresponding to the articles for sale and these dummy articles are arranged on a plurality of display shelves 4. On these shelves or on other shelves 5 there are a plurality of tokens corresponding to each of the articles for sale. As shown in FIG. 5 each token 20 carries certain information about the article. A token in the form of a plastic plate may carry a photograph 21 and information concerning the price and the stock number of the article. The customer selects a token corresponding to each of the articles he wishes to purchase and takes the tokens to the reception area 2. This reception area is in the form of a long counter 6 having a number of pay areas 7 spaced apart along its length. One side of the counter is accessible to the customer in the display area but the counter separates the display area from a second area 22 between the counter and the storage area 3. This area 22 and the storage area 3 are inaccessible to the customers.

As shown in more detail in FIG. 4 the counter carries guide means, which may be in the form of a roller track or a conveyor belt 23, which extends from one pay area to the next. In addition to these guide means there is a further guide means, conveniently in the form of a roller table or conveyor belt 24 which extends from one end of the counter to the other. In the arrangement shown in FIG. 4 the conveyor 24 is shown positioned between the conveyors 23 and the second area 22 but if desired the conveyor 24 could be positioned below the conveyors 23, i.e. below the upper surface of the counter.

Shop assistants are positioned behind the counter and in the second area 22 and behind them are the ends of a large number of conveyors 9 extending to the area 22 from the storage area 3. The conveyors are arranged side-by-side and also in a plurality of horizontal rows. As shown in FIG. 2 the ends of the conveyors in each row in area 22 are set back from the ends of the conveyors in the row beneath it so that the assistants have little difficulty in taking articles from off of the conveyors. In the storage area which may be temperature controlled the incoming goods to the emporium are stored and the conveyors are kept full of articles with one type of article being located on one particular conveyor.

When the customer has selected all the tokens corresponding to the articles required in the display area, they are passed to an assistant in the area 22 who selects the corresponding goods from the ends of the conveyors behind him and places them in a receptacle 10 on one of the conveyors 23. This receptacle may take the form of a wire basket 10 as shown in FIG. 3. The basket is closed on all sides except that facing the assistant so that the interior of the basket is inaccessible to the customer. The assistant places the articles in the basket through the open side and the basket has hooks 25 on its underside which enables the basket to be connected to the conveyor 23. The basket containing the articles is displaced along the conveyor to the nearest pay area 7. The assistant places the tokens in a pocket 26 on the side of the basket which is inaccessible to the customer so that the tokens are also displaced with the basket and the articles to the pay area.

If however the customer wishes to make purchases of articles which are on conveyors spaced apart by a considerable distance, it may be preferable for the receptacle containing some of the articles to be displaced along the conveyor 24 which extends the entire length of the counter and other articles are put in it as it passes through various stations and eventually the customer collects the receptacle with all the required articles at the pay area 7A at one end of the counter.

At whichever pay area the basket is received, a further assistant calculates the charge for the articles in the receptacle from the tokens which are in the pocket 26 and after the customer has paid for the articles the customer receives the articles, or is allowed to take the articles from the receptacle.

It will be seen therefore that the articles are inaccessible to the customer until the customer has visited a pay area and paid for the articles in the receptacle. The chance of the customer shoplifting is thus almost entirely removed. In addition unwanted handling of goods, which are not subsequently purchased is almost entirely avoided.

Other advantages resulting from the invention are that less floor space is required in the display area as compared with conventional supermarkets because only one dummy article corresponding to each article for sale is on show. Shelf stocking in a conventional supermarket takes up a considerable amount of time and this is avoided in the present arrangement in that goods are taken straight from the storage area and placed on the conveyors 9.

As the articles for sale are handled less frequently and not at all by the customer until they have been purchased, the packaging of the articles need not be so strong as is the case in conventional supermarkets and a considerable saving in packaging costs can result.

I claim:

1. A method of vending in which dummy articles corresponding to those offered for sale are on show in a display area along with tokens carrying information relating to the article including the price, a customer in the display area selects at least one token corresponding to an article which he wishes to purchase and gives the token to an assistant who selects the corresponding article from one of a multiplicity of conveyors transporting the articles offered for sale from a storage area inaccessible to the customer and places it along with the token in a receptacle, the interior of which is also inaccessible to the customer, the receptacle containing the article and token is displaced along a guide path to a pay area where the information on the token is used to determine the amount which the customer is charged, the customer pays for the article and receives the article from the receptacle.

2. An emporium having a display area to which potential customers have access and containing dummy articles and tokens carrying information relating to the articles which are offered for sale, a serving counter separating said display area for a second area to which the customers do not have access, a multiplicity of conveyors extending from a storage area to said second area, the articles offered for sale being brought to the second area on said conveyors, said display area having at least one pay area at which a customer pays for articles corresponding to tokens selected in the display area, a receptacle in the form of a wire basket open only at one side, means on the counter and co-operating means on the basket for guiding the receptacle so that the interior of the receptacle is inaccessible to the display area but accessible to the second area, along said counter to at least one pay area whereby articles corresponding to tokens selected by a customer in the display area and placed in the receptacle in the second area are transferred to the pay area and are delivered to the customer after payment.

3. An emporium as claimed in claim 2 in which each of said conveyors is arranged to be displaced in the direction of its length through a distance substantially equal to the spacing of the articles which it is supporting each time one article is removed from the conveyor.

4. An emporium as claimed in claim 3 wherein said conveyors are arranged in a plurality of horizontal rows with the ends of the conveyors of each row in the second area being set back from the ends of the conveyors in the row positioned below it.

5. An emporium as claimed in claim 2 wherein each of said tokens is in the form of a plate of plastics material carrying a description and the price of the article it represents.

6. An emporium as claimed in claim 2 in which said co-operating means on the basket comprise hooks by which the basket can be removably attached to a movable conveyor which forms said guide means on the counter.

\* \* \* \* \*